UNITED STATES PATENT OFFICE.

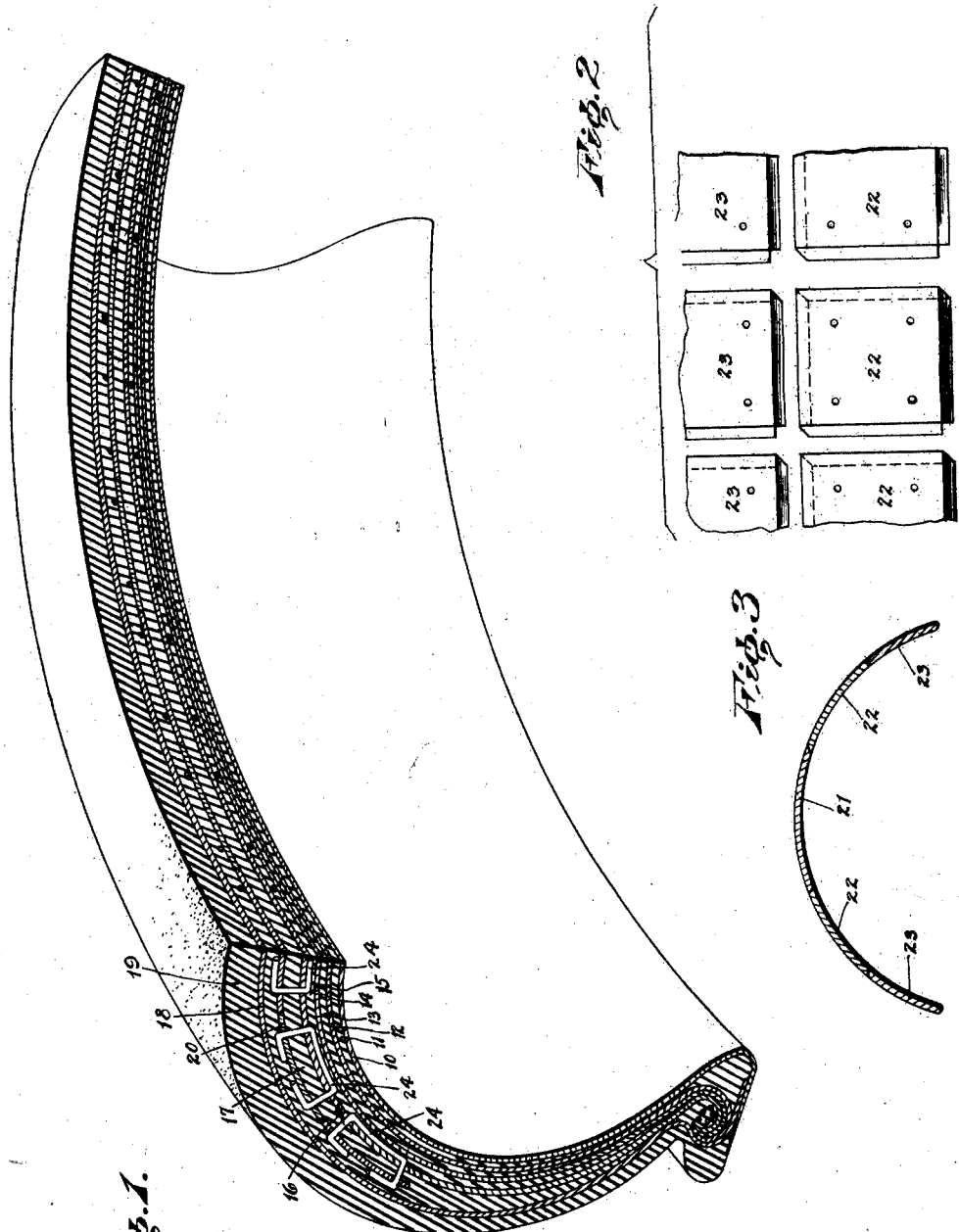

W HERBERT ALDRIDGE, OF PORTLAND, OREGON.

TIRE-ARMOR.

1,401,301.   Specification of Letters Patent.   Patented Dec. 27, 1921.

Application filed October 25, 1920. Serial No. 419,212.

*To all whom it may concern:*

Be it known that I, W HERBERT ALDRIDGE, citizen of Canada, residing at Portland, in the county of Multnomah and State of Oregon, have invented certain new and useful Improvements in Tire-Armors, of which the following is a specification.

This invention relates to an improved tire armor and has as one of its principal objects to provide an armor which will prevent puncture of a tire.

A further object of the invention is to provide an armor adapted to be built into the structure of a tire.

And the invention has as a still further object to provide an armor which will not detract from the elasticity of the tire or, in practical use, cause injury to the tire carcass.

Other and incidental objects will appear hereinafter.

In the drawing:

Figure 1 is a fragmentary sectional view showing a tire embodying my improved armor.

Fig. 2 is a fragmentary plan view showing the plates of the armor disassembled, and Fig. 3 is a fragmentary sectional view showing the armor plates assembled.

Referring now more particularly to the drawing, I have shown my improved armor in connection with a tire which is built up of a number of layers. An inner layer 10 of fabric is employed, this layer providing a lining. Overlying the layer 10 are alternate rubber and fabric layers 11, 12, 13, 14 and 15. Overlying the rubber layer 15 is a layer of fabric 16 covered by a somewhat thicker layer of rubber 17. Overlying the layer 17 is a layer of fabric 18 upon which is imposed a layer of rubber 19 thickened toward the crown of the tire to form a tread.

In carrying the invention into effect, my improved armor is embedded in the layer 17 of the tire to extend beneath the tread thereof and also well down the sides of the tire, being indicated as a whole by the reference numeral 20. This armor is made up of a plurality of mating transversely extending series of plates 21, 22 and 23. These plates are preferably formed of suitable resilient sheet metal and, as will be observed upon reference to Fig. 3 of the drawing, the plate 21 of each series is the longest. The plates 22, which are of equal length, are somewhat shorter than the plate 21 while the plates 23, which are also of equal length, are somewhat shorter than the plates 22. The plates are curved both longitudinally and transversely to conform to the curvature of the tire and, as will be noted, the plate 21 of each series is beveled outwardly at its ends to overlie the inwardly beveled upper ends of the plates 22. Likewise, the lower ends of the plates 22 are outwardly beveled to overlie the inwardly beveled upper ends of the plates 23 so that inward radial movement of the plate 21, when the tire is flexed in practical use, will be communicated to all of the plates of each series. As particularly shown in Fig. 2, corresponding side edges of the plates of each series are beveled to overlie the corresponding side edges of one adjacent series of plates while opposite corresponding side edges of each series are beveled to lie beneath the overhanging beveled edges of the other adjacent series of plates so that lap joints between the series of plates in a direction circumferentially of the tire are provided. Engaged through the fabric layer 16 of the tire from the inner side thereof and through the several plates of the armor, two to each plate, are staples 24. These staples are rectangular in general configuration and the end portions of each thereof are bent over at substantially right angles to confront each other lying against the outer side faces of the plates respectively. The plates will thus be connected to the fabric layer 16 and anchored within the layer 17 so that displacement of the plates with respect to each other will be prevented. Accordingly, the plates will at all times present a continuous armor throughout the circumference of the tire, rendering puncturing of the tire practically impossible. Furthermore, as will be noted, the armor extends well down the sides of the tire so as to protect the tire along its sides. As shown in Fig. 1 of the drawing, the layer 17 of rubber overlies the free ends of the staples at the outer sides of the plates while the layer 15 of rubber overlies the back pieces of the staples at the inner side of the fabric layer 16 so that an effective cushion

Having thus described the invention, what is claimed as new is:

1. In a tire, superposed rubber layers having a canvas layer arranged therebetween, an armor embedded in one of the rubber layers, and staples engaged through the canvas layer from the inner side thereof and through the armor connecting the armor to the canvas layer, the free end portions of the staples being embedded in the first rubber layer and the backs of the staples being embedded in another rubber layer.

2. In a tire, superposed rubber layers having a canvas layer arranged therebetween, an armor embedded in one of the rubber layers, and staples engaged through the canvas layer and through the armor connecting the armor to the canvas layer, the free end portions of the staples being embedded in one rubber layer and the backs of the staples being embedded in another rubber layer.

In testimony whereof I affix my signature.

W. HERBERT ALDRIDGE. [L. S.]